US007233766B2

(12) United States Patent
Matsuyama et al.

(10) Patent No.: US 7,233,766 B2
(45) Date of Patent: Jun. 19, 2007

(54) SCREW CONVEYOR AND DEVELOPER CONVEYING MECHANISM

(75) Inventors: Kazuhiro Matsuyama, Nara (JP); Hirokazu Yamauchi, Kyoto (JP); Yoshiaki Masuda, Nara (JP); Hiroshi Kida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 139 days.

(21) Appl. No.: 11/068,875

(22) Filed: Mar. 2, 2005

(65) Prior Publication Data

US 2005/0196207 A1 Sep. 8, 2005

(30) Foreign Application Priority Data

Mar. 8, 2004 (JP) ............................ 2004-064582

(51) Int. Cl.
*G03G 21/00* (2006.01)
*G03G 15/08* (2006.01)
*B65G 33/26* (2006.01)

(52) U.S. Cl. ...................... 399/358; 366/318; 366/343; 399/256

(58) Field of Classification Search ................ 399/358, 399/359, 254, 256; 366/241, 244, 279, 318, 366/325.3, 342, 343
See application file for complete search history.

(56) References Cited

U.S. PATENT DOCUMENTS 3,924,567 A * 12/1975 Koeleman et al. .......... 399/254
4,003,717 A * 1/1977 Cass et al. .................... 44/551
4,659,212 A * 4/1987 Ichihara et al. ............. 399/358
4,786,001 A * 11/1988 Ephraim et al. ......... 241/101.8
5,481,351 A * 1/1996 Kawai et al. ............... 399/359
5,682,584 A * 10/1997 Hattori et al. .......... 399/256 X
6,711,374 B2 * 3/2004 Funayama et al. .......... 399/359
2005/0019066 A1 * 1/2005 Ito et al. ................ 399/358 X

FOREIGN PATENT DOCUMENTS

JP 63-125963 A * 5/1988
JP 2-121760 U 10/1990
JP 2-121761 U 10/1990
JP 8-211804 A 8/1996
JP 10-291624 A * 11/1998
JP 11-219030 A 8/1999
JP 2000-200021 7/2000
JP 2002-108160 4/2002

* cited by examiner

*Primary Examiner*—Sophia S. Chen
(74) *Attorney, Agent, or Firm*—Nixon & Vanderhye, P.C.

(57) ABSTRACT

An embodiment of a screw conveyor includes a rotating shaft and a conveying blade helically formed around and loosely coupled with the rotating shaft. One or both of two edges of the conveying blade is/are only fixed to the rotating shaft, and a gap is provided between the rotating shaft and the conveying blade. Thereby, the conveying blade can be vibrated in a center axis direction of the rotating shaft by rotation of the rotating shaft and conveyed waste developer.

7 Claims, 7 Drawing Sheets

FIG.5 (a) initial state
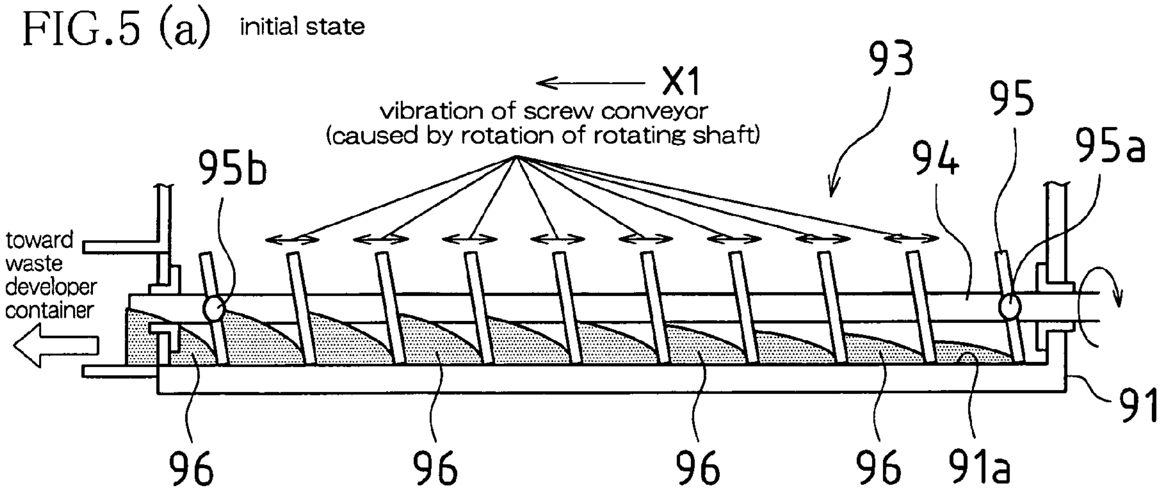
FIG.5 (b) increasing amount of waste developer
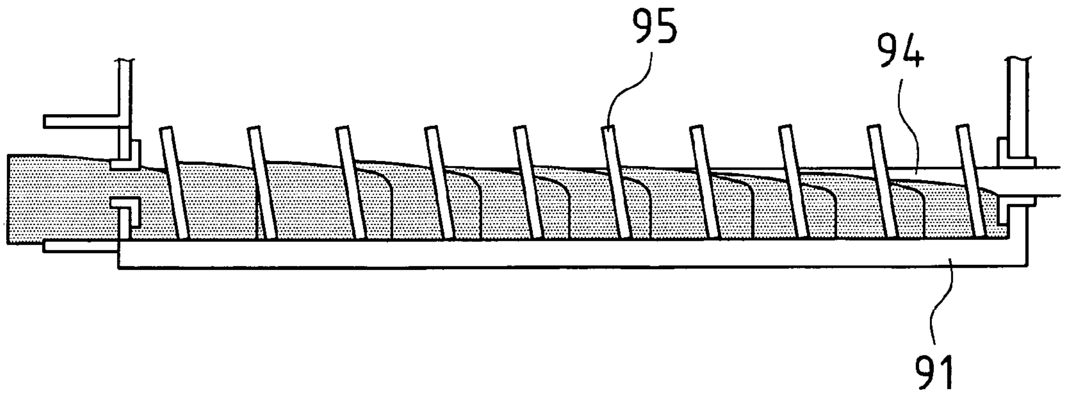
FIG.5 (c) after life
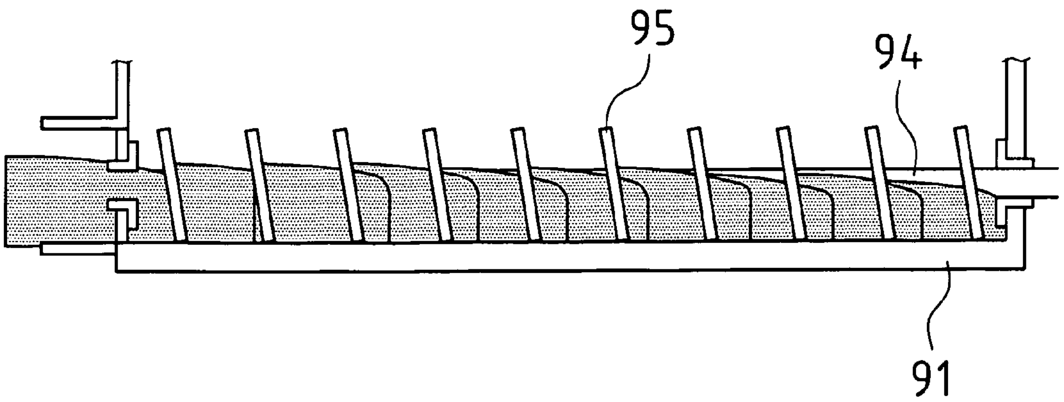

Conventional Art
FIG.6 (a)
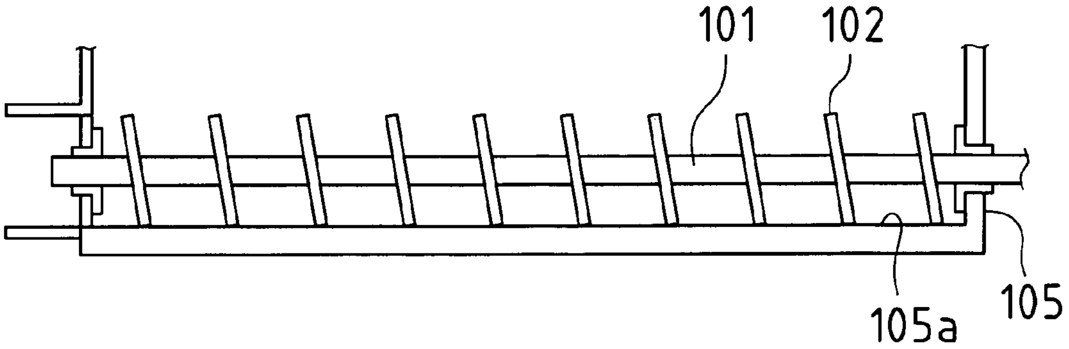
Conventional Art
FIG.6 (b) initial state
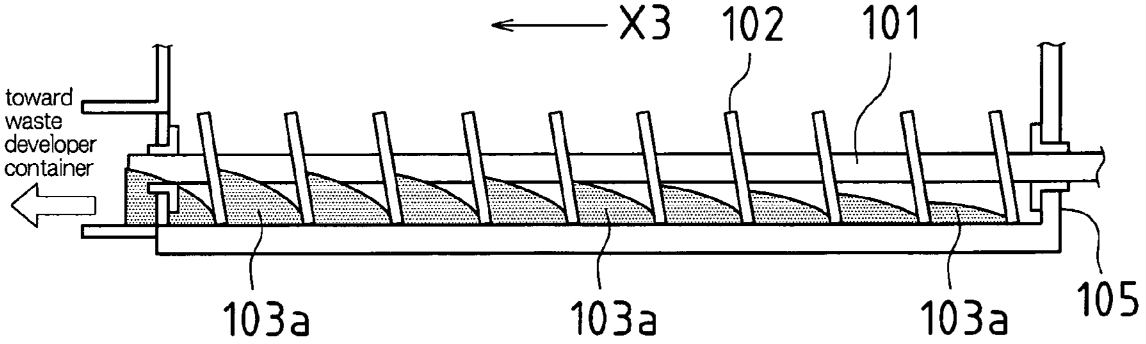
Conventional Art
FIG.6 (c) increasing amount of waste developer
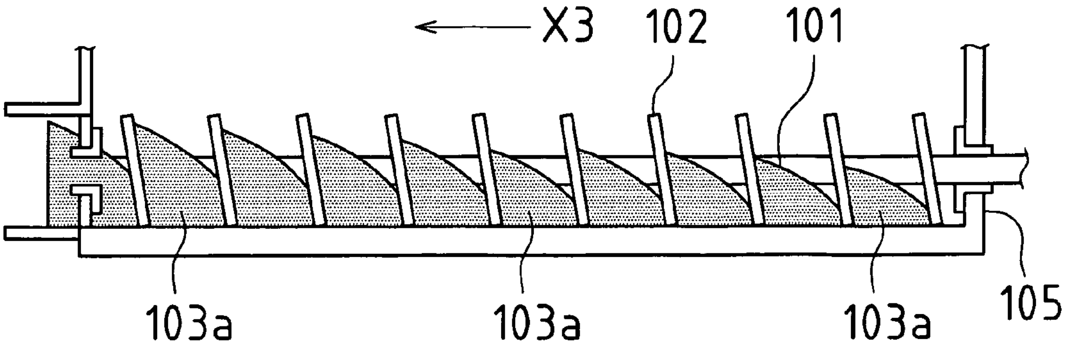

Conventional Art
FIG.6 (d) screw conveyor is full
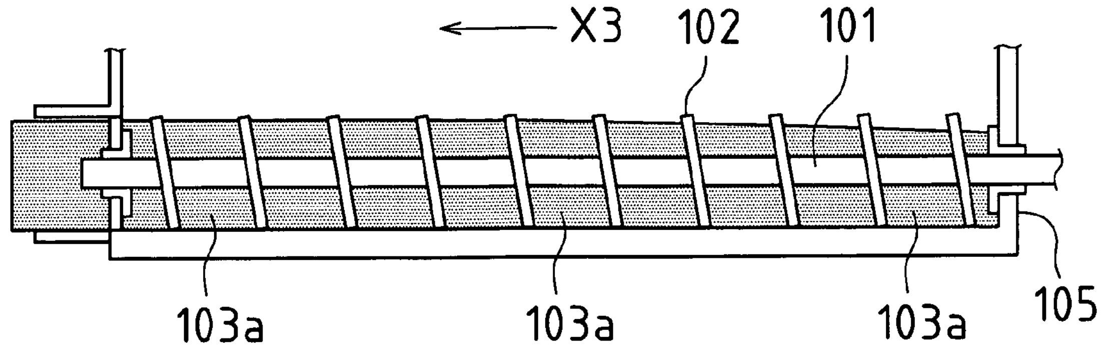
Conventional Art
FIG.6 (e) occurrence of blocking phenomenon
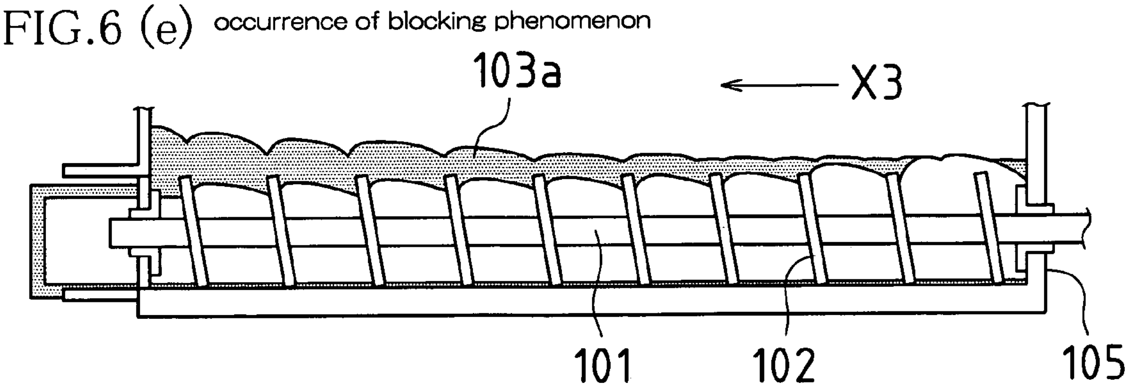

SCREW CONVEYOR AND DEVELOPER CONVEYING MECHANISM

CROSS REFERENCE TO RELATED APPLICATIONS

This application claims priority under 35 U.S.C. § 119(a) to Patent Application No. 2004-64582 filed in Japan on Mar. 8, 2004, the entire contents of which are hereby incorporated by reference.

BACKGROUND OF THE INVENTION

1. Field of Invention

The present invention relates to a screw conveyor for conveying powder, and more particularly to a screw conveyor for use in a mechanism of conveying/recovering developer which is employed in an image forming apparatus.

2. Conventional Art

A conventional screw conveyor for use in a developer conveying/recovering mechanism has a structure such that an entire conveying blade 102 is completely fixed to a rotating shaft 101 as shown in FIG. 6(*a*).

When such a screw conveyor is used to convey developer, the conveying performance thereof varies depending on the fluidity of the developer. Developer itself usually has a high level of fluidity. However, if exposed to environmental changes, particularly a high humidity condition, each developer absorbs moisture in the air to expand, resulting in a decrease in the fluidity thereof. This is clearly seen from developer in a storage container with a history of exposure to high temperature and high humidity. Such developer is supplied as lumps of powder but not as individual powder particles. The fluidity of such lumps of developer is low.

Image information which is developed on an electrostatic latent image carrier (using developer) is transferred onto a paper sheet. In this case, there is residual developer (waste developer) which is not transferred onto the electrostatic latent image carrier. A cleaning unit is provided so as to remove the residual developer from the electrostatic latent image carrier. However, the cleaning unit removes from the electrostatic latent image carrier not only the residual developer but also dust adhering to a surface of a paper sheet conveyed to the transfer step, short fiber constituting paper (mainly, cellulose fiber), filler ($SiO_2$, etc.) contained in paper, and the like. If these impurities are thus mixed into the waste developer, the dust and the short fiber entangle, resulting in a reduction in the fluidity of the waste developer.

When conveying the waste developer whose fluidity is thus reduced, the conveying blade 102 supported by the rotating shaft 101 is affected by greater rotational load as the weight of the conveyed waste developer is increased. During the rotation, heat is generated between the conveying blade 102 and a side wall surface or the like of a developer holding unit 105. The heat phenomenon softens the waste developer which in turn adheres to the conveying blade 102, the side wall surface of the developer holding unit 105 or the like, leading to a deterioration in conveying performance. If such a condition is continued, the waste developer is accumulated on and around the screw conveyor, resulting in a "blocking phenomenon" or clogging of the screw conveyor.

A description will be given of how such a blocking phenomenon occurs with reference to FIGS. 6(*b*) to 6(*e*) which show schematic cross-sectional views of a conventional screw conveyor.

FIG. 6(*b*) shows an initial state of the screw conveyor in a conventional cleaning unit (immediately after the apparatus is installed or maintenance is ended).

Waste developer (shaded in the figure) 103*a* is conveyed toward a waste developer container not shown (in a direction indicated by arrow X3 in the figure) by rotation of the rotating shaft 101 of the screw conveyor and inclination of the conveying blade 102 while the waste developer 103*a* is accumulated on a bottom 105*a* of the developer holding unit 105. If such a condition is continued (as the number of sheets printed by the apparatus is increased), the amount of the waste developer 103*a* is gradually increased in the developer holding unit 105 as shown in FIG. 6(*c*). Finally, as shown in FIG. 6(*d*), the developer holding unit 105 is filled with the waste developer 103*a*.

Thus, as the amount of the waste developer 103*a* is increased in the developer holding unit 105, impurities (dust, short fiber, filler, etc.) other than the developer reduce the fluidity of the waste developer 103*a*. The waste developer 103*a* having a low fluidity becomes rotational load to the screw conveyor, and adheres to the rotating shaft 101 and the conveying blade 102 to further increase the rotational load.

As the rotational load is thus increased, the poor fluidity prevents the waste developer 103*a* from being conveyed in the direction of arrow X3, so that the waste developer 103*a* is rotated at a fixed position. As a result, the waste developer 103*a* is rubbed against the side wall or the like of the developer holding unit 105, leading to an increase in temperature. The increased temperature causes aggregation of the waste developer 103*a*, resulting in the blocking phenomenon. FIG. 6(*e*) shows the blocking phenomenon which thus occurs in the developer holding unit 105. When the rotational torque of the rotating screw conveyor is large, the waste developer 103*a* is not present on the conveying blade 102 and lumps of the waste developer 103*a* are accumulated in the vicinity of the conveying blade 102 as shown in FIG. 6(*e*). On the other hand, when the rotational torque of the screw conveyor is small, the screw conveyor is not rotated, so that combined gears coupled with a drive source are damaged.

The phenomenon occurs significantly at high temperature and high humidity. Specifically, the waste developer swells due to moisture in the air, thereby making the problem worse. An actual experiment performed by the present inventors observed a blocking phenomenon (condition of FIG. 6(*e*)) caused by waste developer, in which a screw conveyor could not be seen from the top at the time when 15,000 sheets had been printed after maintenance.

In order to prevent such a blocking phenomenon and a clogging phenomenon of a screw conveyor, a technique has been proposed in which the center axis of a conveying blade is shifted from the center axis of the rotating shaft of a screw conveyor so that the conveying blade is eccentrically rotated during screw rotation for conveying developer (see, for example, JP 2002-108160A).

A mechanism of a screw conveyor which conveys powder, such as developer or the like, is that powder built up on a wall or the like of a developer holding unit is lifted up and moved forward by rotation of an inclined conveying blade of the screw.

However, the technique of JP 2002-108160A has a new problem with the eccentricity of the screw conveyor. Specifically, the screw is departed from the center due to rotation. Therefore, the force of lifting the powder (developer) buildup on the wall or the like of the developer holding unit is reduced (this is because the eccentric situation causes the outer edge of the blade to approach or leave the wall surface), leading to a reduction in conveying performance.

SUMMARY OF THE INVENTION

A screw conveyor and a developer conveying mechanism has a conveying blade which floats with respect to a rotating shaft. One or both of two edges of the conveying blade is/are only fixed to the rotating shaft, so that the conveying blade can be vibrated in a center axis direction of the rotating shaft when conveying developer, thereby making it possible to prevent a reduction in conveying performance of the conveying blade even if the fluidity of the developer is decreased. Therefore, it is possible to avoid a problem, such as a blocking phenomenon of developer, or the like, to the extent possible, and further avoid a deterioration as much as possible in print quality due to poor conveying performance and occurrence of a problem, such as damage of an apparatus (each unit) or the like.

The screw conveyor conveys powder and comprises a rotating shaft and a conveying blade helically formed around and loosely coupled with the rotating shaft, in which the conveying blade can be vibrated in a center axis direction of the rotating shaft by rotation of the rotating shaft and the conveyed powder. In this case, one or both of the two edges of the conveying blade is/are only fixed to the rotating shaft, so that the conveying blade can be rotated along with the rotating shaft. In other words, the portion other than both the edges of the conveying blade is not fixed to the rotating shaft. Further, a gap is provided between the rotating shaft and the conveying blade so that the vibration of the conveying blade in the center axis direction can be more smoothly performed.

The conveying blade is slightly vibrated in the center axis direction by rotation of the screw conveyor and force of conveyed waste developer (powder). The vibration prevents the waste developer from adhering to the conveying blade. In other words, the waste developer is conveyed in the center axis direction toward a waste developer container by rotation of the screw conveyor, and at this time, the screw conveyor is subjected to a load in the reverse direction of the conveying direction by the waste developer. Therefore, the screw conveyor repeats slight expansion and contraction in the center axis direction while rotating due to the load by the waste developer. The slight expansion and contraction breaks up the waste developer while it is conveyed, and also shakes off the waste developer which has adhered to the screw conveyor. As a result, the waste developer is not rotated at a constant position even if the fluidity is decreased, so that the waste developer is conveyed toward the waste developer container. Therefore, substantially no blocking phenomenon occurs. The substantial elimination of the blocking phenomenon is beneficial for a whole image forming apparatus. Specifically, a photoconductive material is prevented from being stained, thereby increasing the lifetime of the photoconductive material and the print quality, and lowering the power consumption of a drive source.

The screw conveyor is preferably used in a developer conveying mechanism, a developer recovering mechanism or the like for conveying developer or waste developer (powder) in an image forming apparatus.

There is a conventional technique in which a coil spring is provided in a cylindrical conveying pathway. Specifically, the coil spring has a diameter such that the coil spring contacts an inner wall surface of the cylindrical conveying pathway. Powder is conveyed by rotating the coil spring with high speed. However, this technique is achieved under a condition such that the conveying pathway and a storage container for holding the conveyed powder are sealed. Therefore, the technique cannot be applied to a structure (e.g., a cleaning unit, etc.) whose top is open so that waste developer adhering to a photoconductive drum can be recovered.

BRIEF DESCRIPTION OF THE DRAWINGS

FIG. 5(*a*) is a schematic cross-sectional diagram showing an initial state of the screw conveyor of the example embodiment (immediately after an apparatus is installed or maintenance is ended).

FIG. 5(*b*) is a schematic cross-sectional diagram showing the screw conveyor of the example embodiment in which the amount of waste developer is gradually increased.

FIG. 5(*c*) is a schematic cross-sectional diagram showing the screw conveyor of the example embodiment after the life thereof.

FIG. 6(*a*) is a schematic cross-sectional diagram showing a structure of a conventional screw conveyor.

FIG. 6(*b*) is a schematic cross-sectional diagram showing an initial state of the conventional screw conveyor (immediately after an apparatus is installed or maintenance is ended).

FIG. 6(*c*) is a schematic cross-sectional view of the conventional screw conveyor in which the amount of waste developer is gradually increased.

FIG. 6(*d*) is a schematic cross-sectional view of the conventional screw conveyor which is filled with waste developer.

FIG. 6(*e*) is a schematic cross-sectional view of the conventional screw conveyor in which a blocking phenomenon occurs.

DESCRIPTION OF THE PREFERRED EMBODIMENTS

Hereinafter, an image forming apparatus comprising a developer holding means associated with an example embodiment will be described with reference to the accompanying drawings.

Description of Whole Image Forming Apparatus

Figure 1:
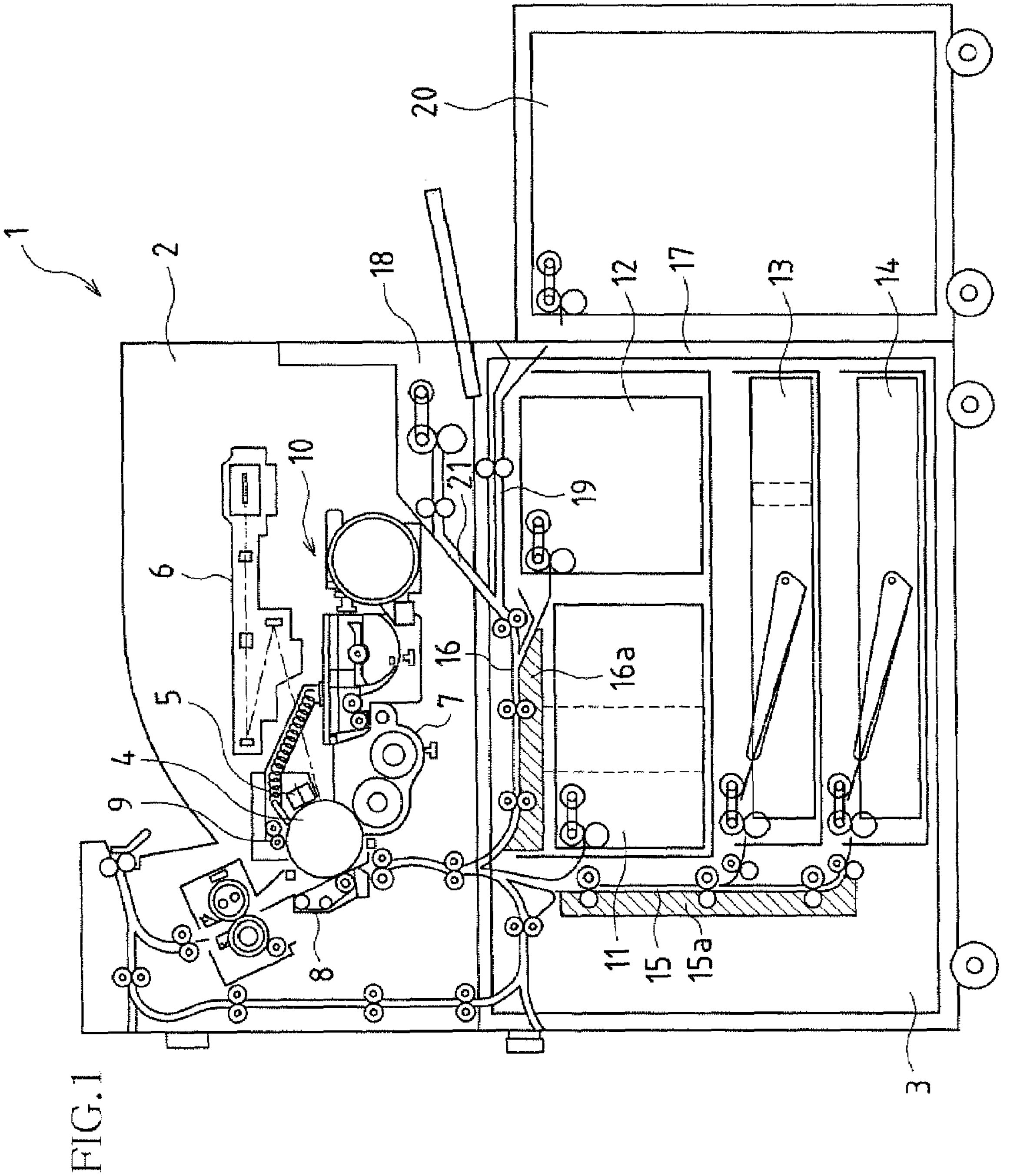
FIG. 1 is a diagram showing a whole structure of an image forming apparatus comprising a developer holding means associated with an example embodiment.

FIG. 1 is a diagram showing a whole structure of the image forming apparatus.

The image forming apparatus 1 of the example embodiment comprises a printer section (image forming section) 2 and a paper feed unit portion 3 disposed below the printer section 2. An electrophotographic processing portion having a photoconductive drum 4 at its center is disposed at substantially a middle of the printer section 2. Specifically, a charging unit 5, an optical scanning unit 6, a developing unit 7, a transfer unit 8 and a cleaning unit 9 are disposed around the photoconductive drum 4.

The charging unit 5 is used to uniformly charge a surface of the photoconductive drum 4. The optical scanning unit 6 scans a light image over the uniformly charged photoconductive drum 4 to write an electrostatic latent image. The developing unit 7 develops the electrostatic latent image written by the optical scanning unit 6 using developer. The transfer unit 8 transfers an image recorded/reproduced on the photoconductive drum 4 onto a recording medium.

The cleaning unit 9 removes developer (toner) remaining on the photoconductive drum 4 so that a new image can be recorded on the photoconductive drum 4. The residual toner removed by the cleaning unit 9 is recovered by a waste developer container (not shown) mounted on a toner supply section 10 of the developing unit 7, and is discarded later.

The paper feed unit portion 3 comprises a plurality of paper feed trays (recording medium supply sections) 11, 12, 13 and 14. The paper feed unit portion 3 can accommodate a variety of paper sheets as recording mediums, which are separated for each size, for example.

The image forming apparatus 1 selects one of the paper feed trays 11, 12, 13 and 14, isolates paper sheets from the selected tray on a sheet-by-sheet basis, and supplies the paper sheet between the photoconductive drum 4 and the transfer unit 8. The transfer unit 8 transfers an image recorded/reproduced on the photoconductive drum 4 onto the paper sheet.

The paper feed tray (first recording medium supply section) 11 and the paper feed tray (second recording medium supply section) 12 are disposed parallel to each other. The paper feed tray 13 is disposed below the paper feed trays 11 and 12. The paper feed tray 14 is disposed below the paper feed tray 13.

The paper feed trays 13 and 14 are assumed to have substantially the same capacity. The capacities of the paper feed trays 11 and 12 are set to be larger than that of the paper feed tray 13 or 14.

The paper feed unit portion 3 has a first transport path 15 and a second transport path 16 for transporting paper sheets stored in the paper feed trays 11, 12, 13 and 14 toward the printer section 2. Note that the first transport path 15 is used to transport paper sheets stored in the paper feed trays 11, 13 and 14 toward the printer section 2, while the second transport path 16 is used to transport paper sheets stored in the paper feed tray 12 toward the printer section 2.

The first transport path 15 extends in a vertical direction along a frame 17 of the paper feed unit portion 3, while the second transport path 16 extends in a horizontal direction along the frame 17.

Therefore, the paper feed trays 11 to 14, the first transport path 15, and the second transport path 16 are disposed in the paper feed unit portion 3 with high efficiency, thereby saving the space of the paper feed unit portion 3.

To load paper sheets into each of the paper feed trays 11, 12, 13 and 14, a desired paper feed tray 11, 12, 13 or 14 is withdrawn from a front side of the main body of the image forming apparatus 1 and the paper sheets are added to the paper feed tray.

If a paper jam occurs in the first transport path 15, the user pulls a guide 15*a* (shaded in the figure) which is a part of the first transport path 15 toward the user. In this case, the guide 15*a* swings around a portion thereof which is positioned deeper in the paper feed unit portion 3 as a pivot. As a result, the user can remove a paper sheet jammed in the first transport path 15. Note the removal operation is performed in a working space previously secured between the first transport path 15 and the frame 17.

If a paper jam occurs in the second transport path 16, the user pulls a guide 16*a* (shaded in the figure) which is a part of the second transport path 16 toward the user. In this case, the guide 16*a* swings around a portion thereof which is positioned deeper in the paper feed unit portion 3 as a pivot. As a result, the user can remove paper jammed in the second transport path 16. Note the removal operation is performed after withdrawing the paper feed trays 11 and 12 parallel to each other toward the user to secure a working space below the second transport path 16.

In the image forming apparatus 1 of the example embodiment, the paper feed trays 11 and 12 are assumed to be able to be simultaneously withdrawn out. The present invention is not limited to this structure. The paper feed trays 11 and 12 may be capable of being independently withdrawn out. In this case, by withdrawing the paper feed tray 11 toward the user, a working space for removing a paper sheet jammed in the second transport path 16 can be secured below the second transport path 16.

A manual paper feed unit 18 in which a relatively small number of paper sheets are set is provided at the second transport path 16 upstream. In general, a particular paper sheet is likely to be set in the manual paper feed unit 18. This is because a paper sheet can be easily changed or set in the manual paper feed unit 18. A paper sheet can be supplied from the manual paper feed unit 18 to the second transport path 16 via a third transport path 21.

Further, a paper feed unit 20 can be linked as an optional apparatus to a right-hand side of the paper feed unit portion 3. The paper feed unit 20 has a larger capacity than those of the other paper feed trays 11 to 14. In this case, a paper sheet fed from the paper feed unit 20 is guided from a fourth transport path 19 via the second transport path 16 to the printer section 2.

Description of a Cleaning Unit Associated with the Embodiment of the Present Invention Next, a description will be given of a cleaning unit which removes residual developer on the photoconductive drum 4 (electrostatic latent image carrier).

Figure 2:
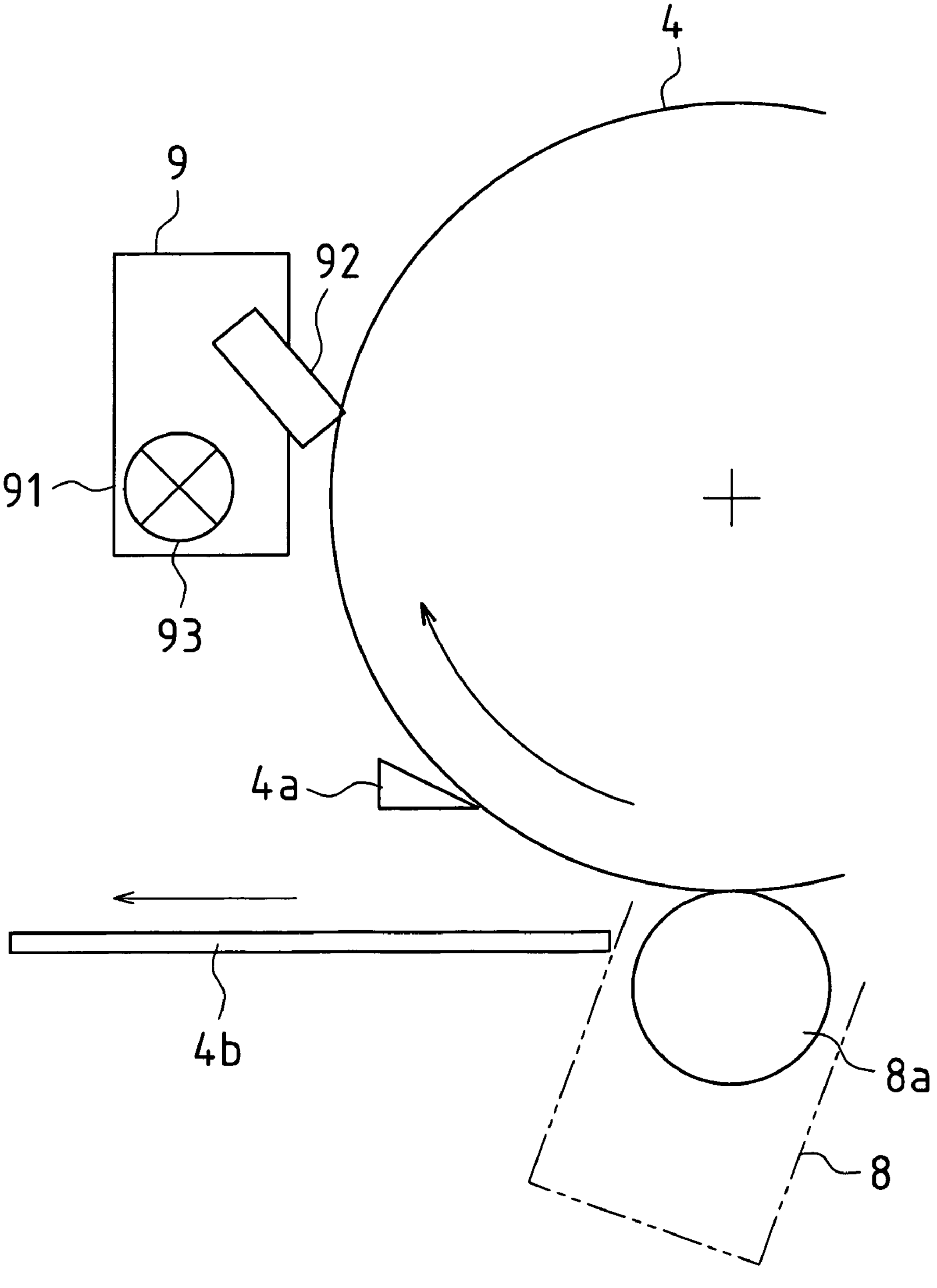
FIG. 2 is a diagram for explaining a position of a cleaning unit associated with the example embodiment.

FIG. 2 is a diagram for explaining a position of a cleaning unit associated with the example embodiment.

Image information which is visualized on the photoconductive drum 4 using developer is transferred onto a transported paper sheet by an electric field applied using the transfer unit 8 comprising a transfer roller 8*a* and the like. In this case, all of the developer is not transferred onto the photoconductive drum 4. It is typically said that the transfer roller 8*a* has a transfer efficiency of 90 to 95% and a transfer charger has a transfer efficiency of 85 to 90%.

The paper sheet on which developer has been thus transferred is released from the photoconductive drum 4 by a release tab 4*a*, and thereafter, is transported on a paper guide plate 4*b* to the next step (fixation mechanism).

On the other hand, developer remaining on the photoconductive drum 4 is not used in the next printing step, and therefore, is removed by the time of a main charging step which is provided on the photoconductive drum 4. To perform this cleaning step, the cleaning unit 9 is provided.

The cleaning unit 9 comprises a cleaning blade 92 (made of a rubber material for prevention of scratch of a photoconductive layer on a surface of the photoconductive drum 4) for mechanically removing the residual developer on the photoconductive drum 4, a screw conveyor 93 for conveying the waste developer thus scraped off to a waste developer container (not shown), and a unit main body 91 for accommodating the cleaning blade 92 and the screw conveyor 93.

The recovered waste developer includes not only the developer but also dust adhering on paper sheets, short fiber (mainly, cellulose) and filler ($SiO_2$, etc.) contained in paper sheets, and the like.

Figure 3:
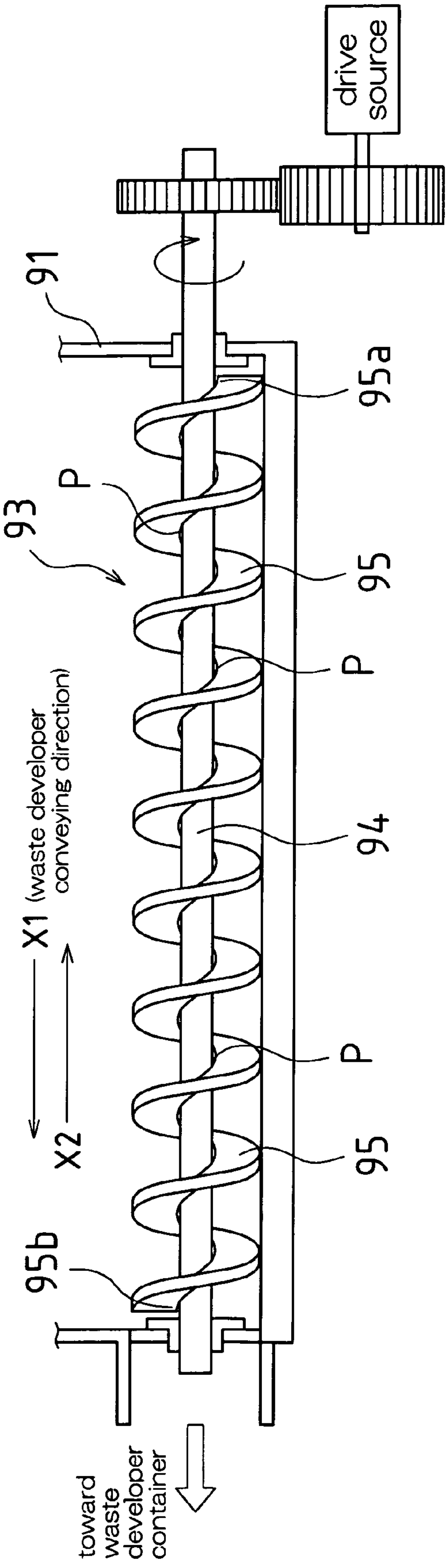
FIG. 3 is a schematic diagram showing a cleaning unit comprising a screw conveyor which is an essential portion of the example embodiment.
Figure 4:
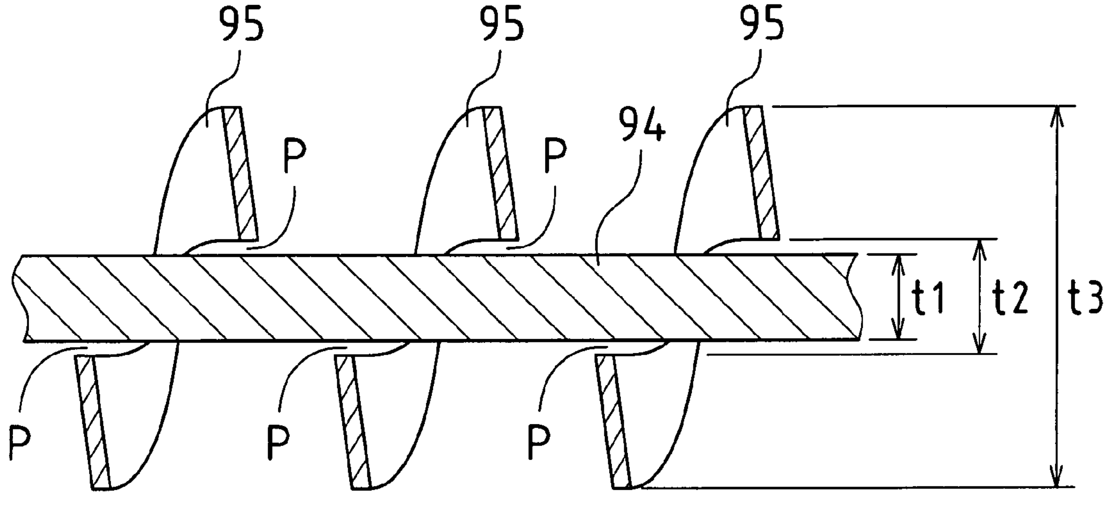
FIG. 4 is a partially enlarged cross-sectional view of the screw conveyor of the example embodiment.

FIG. 3 is a schematic diagram showing the screw conveyor 93 included in the cleaning unit 9, which is an essential portion of the example embodiment. FIG. 4 is a partially enlarged cross-sectional view of the screw conveyor 93.

As described in the "CONVENTIONAL ART" section, a plurality of conveying blades are entirely fixed to a rotating shaft without spacing in a conventional screw conveyor, waste developer is conveyed toward a waste developer container by rotation of an inclined conveying blade of the rotating shaft.

In contrast, the screw conveyor 93 of the example embodiment comprises a rotating shaft 94, and a conveying blade 95 helically wound around and loosely integrated with the rotating shaft 94. The conveying blade 95 can be vibrated in a center axis direction of the rotating shaft 94 (directions indicated by arrows X1 and X2 in FIG. 3) by rotation of the rotating shaft 94 and conveyed waste developer. Therefore, in the example embodiment, the conveying blade 95 is made of a metal material having a certain level of elasticity.

Further, as shown in FIG. 4, the conveying blade 95 floats with respect to the rotating shaft 94, i.e., a gap P is provided between the rotating shaft 94 and the conveying blade 95. The conveying blade 95 is fixed to the rotating shaft 94 by fixing at least one edge of the conveying blade 95 (an upstream edge 95*a* or a downstream edge 95*b* with respect to the conveying direction of waste developer (the direction indicated by X1 in FIG. 3)) to the rotating shaft 94 by welding or the like. If only one edge is fixed, the upstream edge 95*a* is preferable over the downstream edge 95*b*. By thus fixing only the edge(s) of the conveying blade 95 to the rotating shaft 94, the conveying blade 95 can be vibrated in the center axis direction of the rotating shaft 94 (the directions indicated by arrows X1 and X2 in FIG. 3) by rotation of the rotating shaft 94 and conveyed waste developer.

Next, a description will be given of how the screw conveyor 93 thus constructed conveys waste developer with reference to schematic cross-sectional views shown in FIGS. 5(*a*) to 5(*c*).

FIG. 5(*a*) shows an initial state of the unit main body 91 and the screw conveyor 93 of the cleaning unit 9 (immediately after an apparatus is installed or maintenance is ended).

Waste developer (shaded in the figure) 96 is conveyed toward a waste developer container not shown (in a direction indicated by arrow X1 in the figure) by rotation of the rotating shaft 94 of the screw conveyor 93 and inclination of the conveying blade 95 while the waste developer 96 is accumulated on a bottom 91*a* of the unit main body 91. In this case, the conveying blade 95 of the example embodiment is slightly vibrated by rotation of the screw conveyor 93 and force of the conveyed waste developer 96 as described in FIG. 5(*a*). Thereby, the waste developer 96 is prevented from adhering to the conveying blade 95 and the like. In other words, the waste developer 96 is conveyed in the center axis direction toward the waste developer container by rotation of the screw conveyor 93, and at this time, as shown in FIG. 3, the screw conveyor 93 is subjected to a load in the reverse direction X2 of the conveying direction X1 by the waste developer 96. For example, in case the conveying blade 95 is fixed to the rotating shaft 94 at the upstream edge 95*a*, the conveying blade 95 is contracted to deform in the center axis direction due to the load by the waste developer 96. When a restoring force due to the contraction overcomes the load by the waste developer 96, the conveying blade 95 is expanded to its initial position. Thus, the conveying blade 95 repeats contraction and expansion. Similarly, in case the conveying blade 95 is fixed to the rotating shaft 94 at the downstream edge 95*b*, the conveying blade 95 is expanded to deform due to the load by the waste developer 96. When a restoring force due to the expansion overcomes the load by the waste developer 96, the conveying blade 95 is contracted to its initial position. Thus, the conveying blade 95 repeats expansion and contraction. In case the conveying blade 95 is fixed to the rotating shaft 94 at both of the upstream edge 95*a* and the downstream edge 95*b*, the conveying blade 95 repeats deformation and restration by contracting/expanding simultaneously in itself and returning to an initial position thereafter. Therefore, the screw conveyor 93 repeats slight expansion and contraction in the center axis direction while rotating due to the load by the waste developer 96. The slight expansion and contraction breaks up the waste developer 96 while it is conveyed, and also shakes off the waste developer 96 which has adhered to the screw conveyor 93. As a result, the waste developer 96 in the unit main body 91 has a substantially uniform height level. This situation is shown in FIG. 5(*b*).

As the situation is continued (the number of sheets printed by the apparatus is increased), the amount of the waste developer 96 is increased in the unit main body 91 of the cleaning unit 9, so that the fluidity of the waste developer 96 is reduced by impurities (dust, short fiber, filler, etc.) contained in the developer. The waste developer 96 with the lowered fluidity would increase rotational load in conventional screw conveyors. In the example embodiment, the conveying blade 95 is not fixed to the rotating shaft 94, and further, the gap P is provided, resulting in vibration of the conveying blade 95. The vibration effect of the conveying blade 95 reduces the rotational load, so that the conveying of the waste developer 96 is continued. As a result, the waste developer 96 is conveyed to the waste developer container while the height of the waste developer 96 is controlled to be always substantially equal to the height of the rotating shaft 94, as shown in FIG. 5(*c*).

The present inventors actually performed an experiment using the screw conveyor 93 thus constructed. In the experiment, a diameter t1 of the rotating shaft 94 is 5 mm, an inner diameter t2 of the conveying blade 95 is 6 mm (i.e., the gap P=0.5 mm), and an outer diameter t3 of the conveying blade 95 is 14 mm (FIG. 4). As a result of the experiment, the waste developer 96 was conveyed in the state of FIG. 5(*c*) without a blocking phenomenon at the time when 20,000 sheets had been printed after maintenance. Thus, no problem was confirmed.

As described above, the screw conveyor 93 for use in conveying of the waste developer 96 is constructed such that the conveying blade 95 is not entirely fixed to the rotating shaft 94, i.e., only the edge(s) of the conveying blade 95 is fixed to the rotating shaft 94, leaving the gap P. Therefore, vibration caused by rotation of the conveying blade 95 can be effectively utilized, thereby making it possible to eliminate a blocking phenomenon which is otherwise caused by fixation of the waste developer 96. The elimination of the blocking phenomenon is beneficial for the whole image forming apparatus. Specifically, the photoconductive drum 4 is prevented from being stained, thereby increasing the lifetime of the photoconductive drum 4 and the print quality, and lowering the power consumption of the drive source.

In the above-described example embodiment, as an example, the screw conveyor is provided in the cleaning unit 9 for recovering residual developer on the photoconductive drum 4. It will be clearly understood that the present invention may be applied to a screw conveyor used in a developer replenishing container which is used to convey developer in an image forming apparatus, a stirring screw (which may be called a screw conveyor) for stirring and conveying developer in a development unit, and the like. The application of the present invention is not limited to image forming apparatuses, and is applicable to a screw conveyor for conveying various kinds of powder.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A screw conveyor for conveying powder comprising:

a rotating shaft; and a conveying blade helically formed around and loosely coupled with the rotating shaft, the conveying blade having a blade surface for conveying powder, the conveying blade being fixed to the rotating shaft only at one edge of the conveying blade;

wherein the conveying blade can be vibrated in a center axis direction of the rotating shaft by rotation of the rotating shaft and the powder.

2. The screw conveyor according to claim 1, wherein a gap is provided between the rotating shaft and the conveying blade.

3. A developer conveying mechanism comprising the screw conveyor according to claim 2.

4. The developer conveying mechanism according to claim 3, wherein the powder is developer or waste developer in an image forming apparatus.

5. A developer conveying mechanism comprising the screw conveyor according to claim 1.

6. The developer conveying mechanism according to claim 5, wherein the powder is developer or waste developer in an image forming apparatus.

7. The screw conveyor according to claim 1, wherein the one edge is an upstream edge of the conveying blade.

* * * * *